Figure 1:
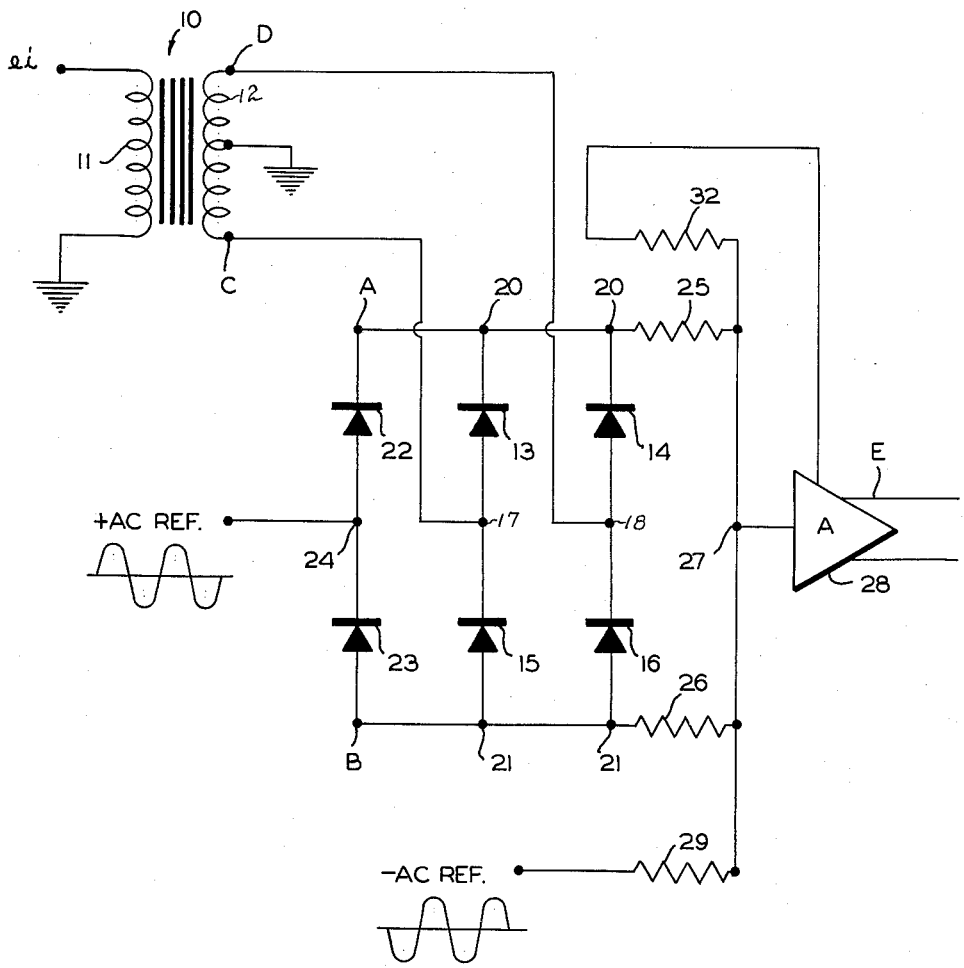

March 6, 1962 C. L. COHEN 3,024,370
ABSOLUTE VALUE CIRCUIT HAVING AN ALTERNATING CURRENT
OUTPUT PHASE LOCKED TO A REFERENCE OSCILLATION
Filed July 7, 1958 2 Sheets-Sheet 1

INVENTOR.
CHARLES L. COHEN

BY
Donald P. Smith

ATTORNEY

Fig. 2.
| CIRCUIT POINT | A | B | C | D | E |
|---|---|---|---|---|---|
| TIME INTERVAL | 1 2 3 4 | 1 2 3 4 | 1 2 3 4 | 1 2 3 4 | 1 2 3 4 |
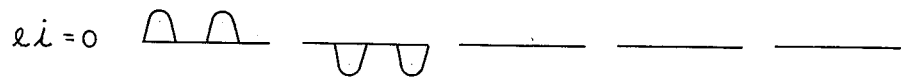
$ei = 0$
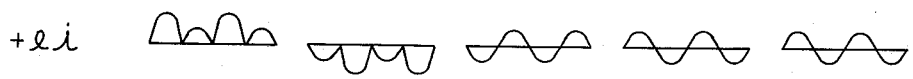
$+ei$
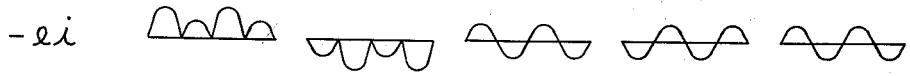
$-ei$
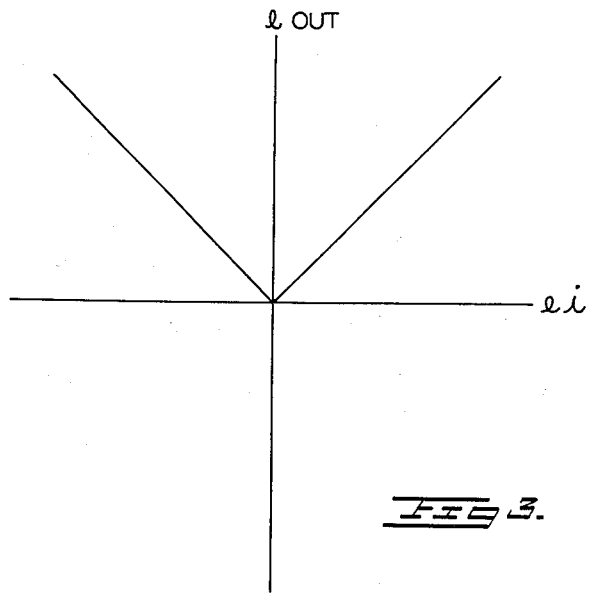
Fig. 3.
INVENTOR.
CHARLES L. COHEN

United States Patent Office 3,024,370
Patented Mar. 6, 1962

3,024,370
ABSOLUTE VALUE CIRCUIT HAVING AN ALTERNATING CURRENT OUTPUT PHASE LOCKED TO A REFERENCE OSCILLATION
Charles L. Cohen, Hyattsville, Md., assignor to ACF Industries, Incorporated, New York, N.Y., a corporation of New Jersey
Filed July 7, 1958, Ser. No. 747,013
3 Claims. (Cl. 307—88.5)

This invention relates generally to function generators and more particularly to a circuit for producing an output characteristic having an absolute phase relationship which is not dependent upon the input phase of an A.C. input. In devices for training personnel in the operation of aircraft it is frequently necessary to provide computers which derive analog voltages proportional to diverse conditions during a simulated flight, such voltages being fed to instruments in the vicinity of a student whereby he is made aware of the simulated flight conditions and characteristics. Some of these conditions, such as rudder drag in an actual aircraft, have a positive value in spite of the direction of motion of the rudder or control member. Thus, no matter which side of the longitudinal axis of an aircraft the rudder is positioned the drag value is a positive quantity. It is, therefore, necessary in deriving voltages proportional to characteristics of this type in an aircraft simulator that the output of a circuit be always in accordance with a reference standard, despite a shift of phase of the input. As will later be more fully explained, the circuit disclosed and claimed herein adroitly solves this problem for an alternating current powered flight simulator.

It is known in the prior art that a high gain D.C. amplifier with appropriate feedback network will derive non-linear functions. As will later be more fully explained the instant invention provides an A.C. circuit for deriving this same function.

It is accordingly a prime object of the present invention to provide a function generator having an output phase characteristic always in accordance with a reference phase and an output amplitude in accordance with the input amplitude.

Another object of the invention is to provide an electronic function generating circuit which delivers an output having a predetermined phase relationship from an input being either in phase or in phase opposition to the predetermined relationship.

It is a further object of this invention to provide a function generator using a plurality of diodes and having an absolute output phase characteristic despite the phase characteristic of the input.

The above objects and advantages will become apparent upon consideration of the following detailed description of a specific embodiment of the invention, especially when taken with the accompanying drawings, hereby made a part thereof, wherein:

FIG. 1 is a schematic circuit diagram of a function generator according to the present invention, FIG. 2 is a diagrammatic presentation of the several wave forms appearing at designated parts of the circuit, and FIG. 3 is a curve showing the R.M.S. relationship between the input and output for the circuit of FIG. 1.

Reference is now made to FIG. 1 wherein reference character 10 denotes an input transformer having a primary winding 11 and a secondary winding 12. The input is impressed across the primary winding and it will be understood that an indication of plus and minus have reference to phase standards. The secondary 12 has a tap at its mid-point connected to a source of zero potential as there shown whereby the secondary energy has two components, one being in phase with the input voltage and the other being in phase opposition thereto. A diode bridge comprising four diodes 13, 14, 15, and 16, having two terminals 17 and 18, connected to the secondary 12 of the transformer, has a pair of additional junctions 20 and 21. A pair of series connected diodes 22 and 23 have a source of reference voltage connected to junction 24 at their mid-point. The source of reference voltage connected to junction 24 is of the desired phase output of the circuit and serves as a standard of reference. As there shown the extreme terminals of the diode pair 22 and 23 are connected across junctions 20 and 21 of the before described diode bridge.

A resistor pair 25 and 26 is connected between junctions 20, 21 and the input 27 of a phase inverting feedback amplifier 28 having a feedback resistor 32. A source of reference voltage of negative phase sense is connected through resistor 29 to the input 27 of the phase inverting amplifier. The ohmic value of resistor 29 is identical to that of resistors 25 and 26 so that, as will later be more fully explained, the reference voltages appearing at the common point 27, being in phase opposition, will cancel and only the input from transformer 10 appears at the final output of amplifier 28.

Reference is here made to application Ser. No. 694,376 by the same inventor for Flight Simulator the disclosure of which is incorporated herein for a discussion of the operating characteristics of the type of diode and feedback operational amplifier used. As is known diodes 13, 14, 15, and 16 will not pass energy entering at the junction points 17 and 18 unless the voltage entering from diodes 22 and 23 is smaller in magnitude than the voltage entering at junctions 17 and 18. It is upon this biasing function that the circuit depends for its functioning.

It should further be explained that the amplitude of the reference voltage applied to junction 24 is presumed to be greater than the amplitude of the voltage impressed on transformer 10, the frequencies are identical and the phase relationship may be in phase or in phase opposition.

The operation of the circuit of FIG. 1 will be explained in connection with the wave forms of FIG. 2 wherein the circuit points designated A to E respectively, are identified in the wiring diagram. When the input to transformer 10, $e_i$, is zero then the plus reference voltage applied at junction 24 will appear at circuit point A as a series of half cycles since diode 22 will pass the positive side and at point B as a series of negative half cycles which pass diode 23 in the conventional manner. These respective positive and negative cycles develop voltages across resistors 25 and 26 and appear at the input of amplifier 28; however, an equal and opposite voltage is developed across resistor 29 from the negative phase sense reference voltage, which voltage effectively cancels the positive reference voltage and the input to the amplifier is zero and, of course, the output is zero.

Now if the input voltage has a like, or positive, phase relationship with respect to the reference voltage applied at junction 24 then the reference voltage appearing at circuit point A will back bias the positive component appearing from point C and only the positive cycle from junction 24 will appear at resistor 25; however, during the same instant of time the negative component developed at point D appears at junction 18 and is passed through diode 16, since there is no negative voltage back biasing this diode, and the input voltage then appears at point B and at input 27. When the next cycle of the input occurs the reference voltage applied to junction 24 now is negative.

It is perhaps best to consider the above circuit operation in terms of the time intervals appearing in FIG.

2. Each time interval 1, 2, 3, 4, represents 180 electrical degrees. At time interval 1 with an input in phase (plus) with the reference negative voltage applied to junction 24 the voltage appearing at point C is in phase opposition to the voltage at point D, and the back biasing of the reference voltage through diode 22 causes only the reference voltage to appear at circuit point A in time interval 1. At point B in time interval 1, the input appearing from point C and applied to junction 17 passes diode 15. In time interval 2, since the reference voltage and the input have assumed their negative swings, the positive cycle from point C will pass diode 13 and appear at point A. Since the amplitude of the negative cycle of the reference voltage applied at 24 is greater than the negative voltage at point D it prevails, and the wave form is as shown in B2. This cycle repeats itself for the full four time intervals except that at circuit point 27 the equal magnitude and oppositely phased reference voltage from 29 cancels out the cycles which appear as A1, A3, B2 and B4 so that the resultant is the wave shown in E1, E2, E3 and E4 which starts with a positive going cycle.

When the input voltage is in phase opposition (minus) to the reference voltage applied to terminal 24 then the wave forms at circuit points C and D are as shown in FIG. 2 for the time intervals 1, 2, 3 and 4, this being of course in direct opposition to the phase relationships of the previously described operation. Since the magnitude of the reference voltage applied to junction 24 is larger than the magnitude of the input voltage from point C appearing at junction 17 the reference voltage will back bias the input voltage on the first 180 degree cycle or interval 1, while the negative phase will pass through diode 16 from junction 18 as shown in B1. In the second interval (2) this is reversed and the positive cycle from point D is not back biased but passes thru diode 14 and appears at circuit point A, in interval 2. Simultaneously, the reference voltage from junction 24 back biases the negative cycle input at point B and prevents the negative cycle input from passing diode 16. Again these cycles are repeated and applied to the input 27 of amplifier 28. It will be noted that at E, after a phase inversion, in both cases, the wave forms will start with a rising cycle and continue throughout the full intervals thus indicating that despite the complete 180 degree phase reversal of the input, still the output maintains its absolute value, in accordance with the preselected phase of the reference voltage applied to junction 24.

Reference is made to the curve of FIG. 3 wherein it is shown that the R.M.S. value of the output is in accordance with a predetermined phase standard, in this case positive, with respect to the abscissa. Since no non-linear components are used in this circuit the magnitude of the output is directly proportional to the magnitude of the input.

Having described a preferred embodiment of the present invention, it is to be understood that although specific terms and examples are employed, they are used in a generic and descriptive sense and not for purposes of limitation; the scope of the invention being set forth in the following claims.

What is claimed is:

1. A function generator of the type for producing an output absolute in phase and proportional in amplitude to the amplitude of an input of varying amplitude and one of two phases comprising in combination a diode bridge having two pairs of junctions, an input transformer having a secondary winding with a grounded center tap and the secondary winding being connected between one pair of said junctions, a pair of resistors connected in series between the other pair of junctions, an output amplifier having a feedback loop connected to the junction between said resistors, a first source of reference voltage of a first phase relationship connected to said junction of the resistors, a pair of diodes having a common junction connected in series across said other bridge junctions, said pair of diodes and the bridge diodes being connected to conduct in the same direction, a source of reference voltage having a phase relationship in opposition to the said first phase relationship connected to the common junction between the pair of diodes, and a source connected to said input transformer for supplying a voltage in phase with either of said reference voltages.

2. Apparatus according to claim 1 including a resistor connected between said first source of reference voltage and said junction between said pair of resistors.

3. A function generator of the type for producing an output absoute in phase and proportional in amplitude to the amplitude of an input of varying amplitude and one of two phases comprising in combination a diode bridge having two pairs of junctions, an input transformer having a secondary winding with a grounded center tap and the secondary winding being connected between one pair of said junctions, a pair of resistors connected in series between the other pair of junctions, an output circuit connected to the junction between said resistors, a first source of reference voltage of a first phase relationship connected to said junction of the resistors, a pair of diodes having a common junction connected in series across said other bridge junctions, said pair of diodes and the bridge diodes being connected to conduct in the same direction, a source of reference voltage having a phase relationship in opposition to the said first phase relationship connected to the common junction between the pair of diodes, and a source connected to said input transformer for supplying a voltage in phase with either of said reference voltages.

References Cited in the file of this patent

UNITED STATES PATENTS

| | | |
|---|---|---|
| 2,666,136 | Carpenter | Jan. 12, 1954 |
| 2,810,885 | Davis et al. | Oct. 22, 1957 |
| 2,817,757 | Durbin | Dec. 24, 1957 |
| 2,866,103 | Blake et al. | Dec. 23, 1958 |
| 2,875,404 | Handel | Feb. 24, 1959 |